INVENTORS:
ERNEST J. SALLEY,
WILLIAM H. JONES,

BY Allen E. Angott
THEIR ATTORNEY.

Jan. 7, 1969 K. HINRICHS ET AL 3,421,093

DETECTOR FOR PULSE CODE MODULATED SIGNALS WITH FEEDBACK FOR BASELINE CORRECTION

Filed Nov. 12, 1965

Sheet 1 of 4

INVENTORS
KARL HINRICHS
PERRY A. DIEDERICH

BY T.E. Kristofferson

ATTORNEY

INVENTORS
CARL HINRICHS
PERRY A. DIEDERICH
BY
TE Kristoffersen
ATTORNEY

INVENTORS
KARL HINRICHS
PERRY A. DIEDERICH
BY
T E Kris Tofferson
ATTORNEY

INVENTORS
KARL HINRICHS
PERRY A. DIEDERICH

United States Patent Office 3,421,093

Patented Jan. 7, 1969

3,421,093

DETECTOR FOR PULSE CODE MODULATED SIGNALS WITH FEEDBACK FOR BASELINE CORRECTION

Karl Hinrichs, Fullerton, and Perry A. Diederich, Orange, Calif., assignors to Beckman Instrument, Inc., a corporation of California Filed Nov. 12, 1965, Ser. No. 507,318

U.S. Cl. 329—104 8 Claims

Int. Cl. H03k *9/00*

ABSTRACT OF THE DISCLOSURE

A pulse code modulated signal detector having a baseline tracking loop in which an input amplifier is provided with a plurality of intergrating, holding and summing circuits connected to its output for action over successive overlapping time periods. First and second sample and hold circuits sample and store the voltage level of each positive and negative bit respectively over a number of bit periods. An average value circuit detects the average of the sample and hold circuits which is fed back to the input amplifier to correct for baseline offset.

Figure 3:
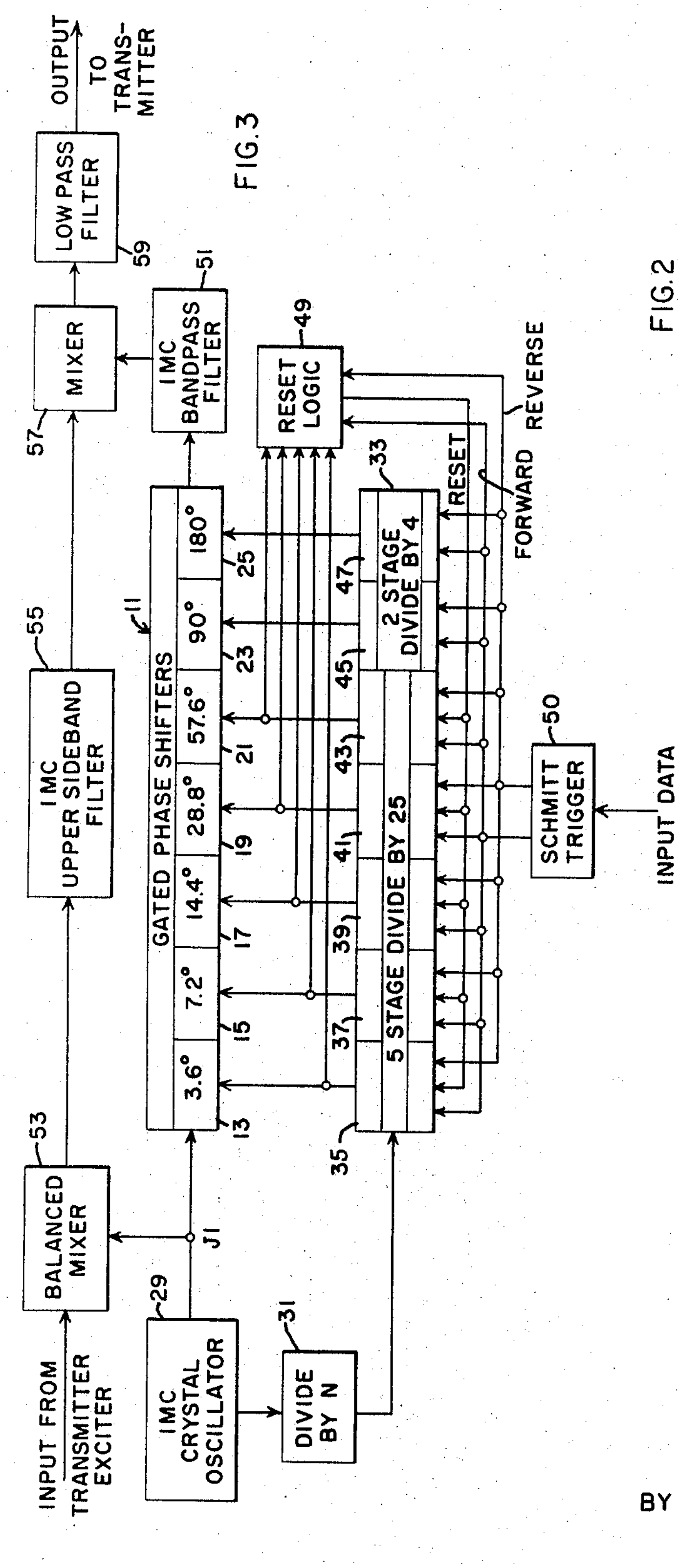

This invention relates to a message gated pulse detector for detecting pulse code modulated video signals containing low frequency noise, wow, or D.C. offset and more particularly, to such a detector including feedback means to correct the incoming video signal for variations in baseline.

All commonly used techniques for the detection of data from pulse code modulated signals are deleteriously affected to some degree by the presence of low frequency noise, wow or D.C. offset on the signal. Of the most practical and useful methods of data detection, for example, the reset integrator, the filter sampler, the zero crossing detector, and the difference-integral detector, only the difference-integral detector inherently provides rejection to low frequency noise. The others must be accompanied by some form of baseline correcting or tracking mechanism. Since the reset integrator is the optimum detector for wide-band (square-wave) pulse code modulated signals in the presence of white random noise, even the rejection of low frequency noise provided by the difference integrator is at the expense of overall performance. However, the difference integrator technique contains all the necessary elements of the single reset integrator method so that detection simultaneously by both techniques, utilizing common equipment, is both possible and practical.

One common prior art method of baseline track is A.C. coupling at the input to the detector rather than D.C. coupling such as by passing the signal through a capacitor. A.C. coupling itself will introduce signal or message dependent wow or baseline disturbance due to fluctuations in the average value of the signal. A second prior art technique is the inclusion of an integrator in the feedback path of an input amplifier. A third is peak detection whereby the average of a positive peak detector and a negative peak detector is utilized for the baseline correcting voltage. The peak detector here may detect the peaks of the signal directly or after filtering. This is done by continually detecting and correcting the positive and negative peaks and averaging. This is inherently slow and will only handle slow moving wow. The effective rejection to wow and low frequency noise offered by any of these techniques is limited to relatively low frequencies. Even wow and noise in the neighborhood of $\frac{1}{100}$ of the data rate is beyond the rejection band of these methods since expanding the rejection band to include higher than very low frequencies results in rejecting a significant portion of the signal energy. This is manifested by strong message dependance upon the performance of the combined data detector and baseline track in the presence of white noise.

Accordingly, it is the main purpose of this invention to provide a new and improved message-gated pulse detector capable of substantially eliminating the effects of low frequency noise, wow or D.C. offset on the video pulse code modulated signal.

This and other objects are achieved by providing a baseline tracking loop for a pulse code modulated signal detector of the type in which an input amplifier receives an incoming pulse code modulated video signal which is characterized in that means are provided for integrating, holding and summing the signal over successive overlapping time periods to provide a delayed, integrated analog of the signal and an indication of the polarity of said signal coincident with the analog to determine whether the analog is positive or negative during each bit period thereof; first sample and hold means are provided to sample and store the voltage level of each positive bit over a number of bit periods; second sample and hold means are provided to sample and store the voltage level of each negative bit over a number of bit periods; means are provided to detect the average value of the first and second sample and hold means, and feedback means connect the average value back to the input amplifier to correct for baseline offset.

Figure 2:
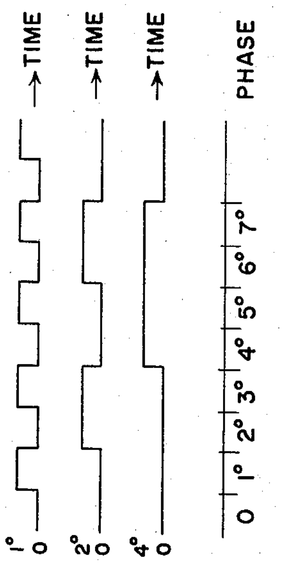
Figure 1:
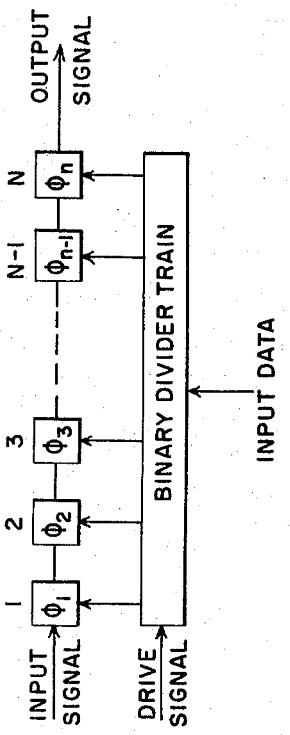
Figure 1:
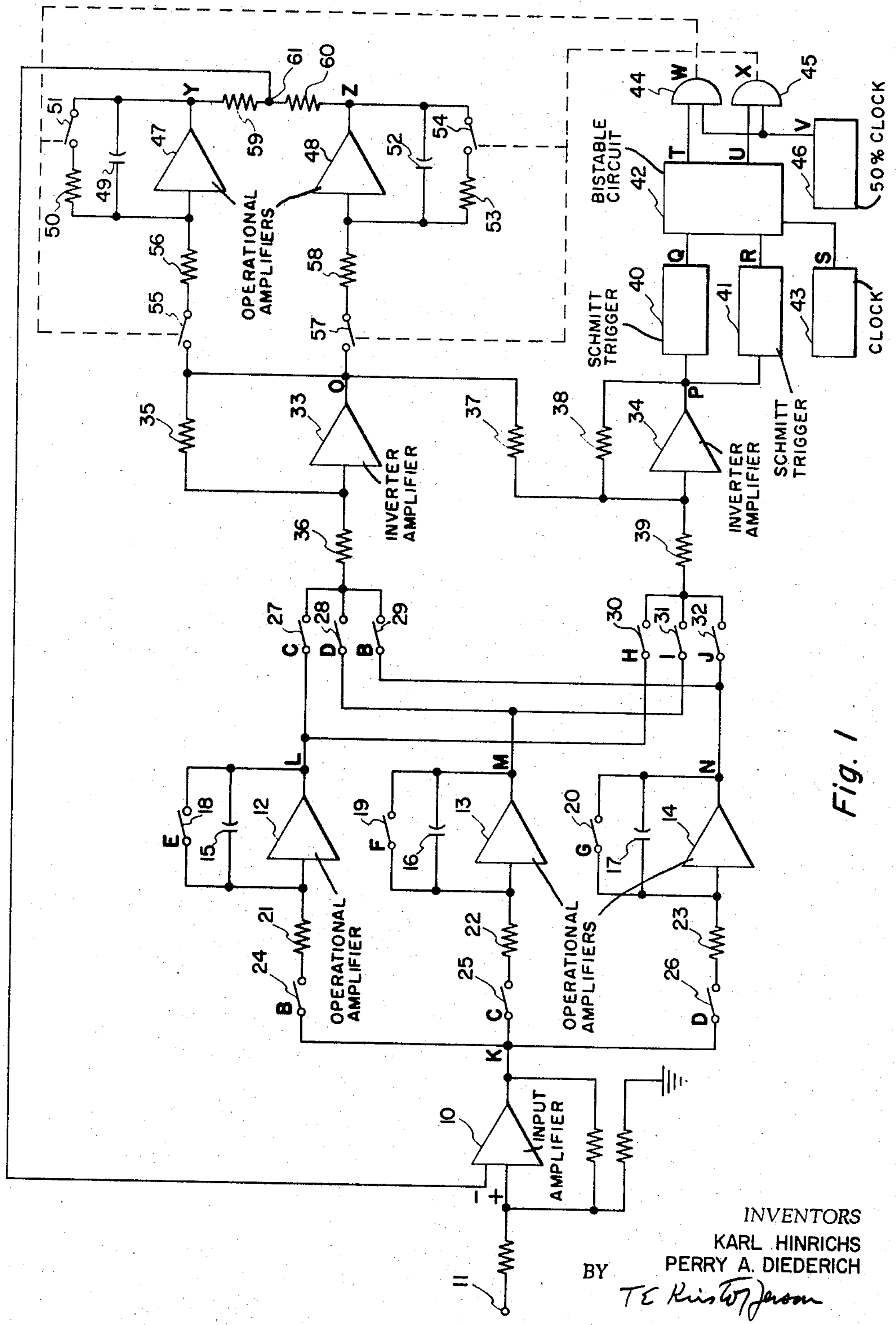
Figure 2:
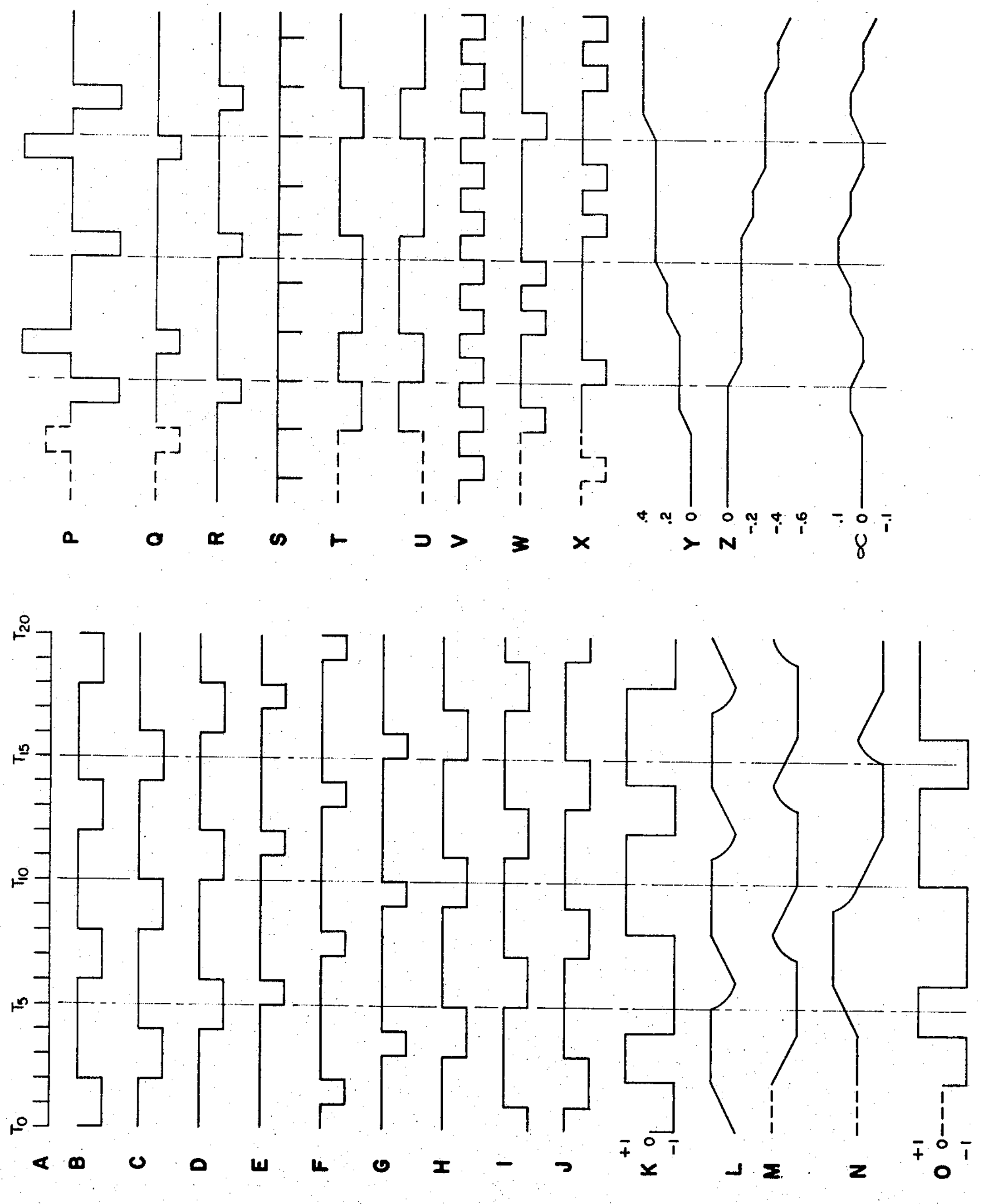
Figure 3:
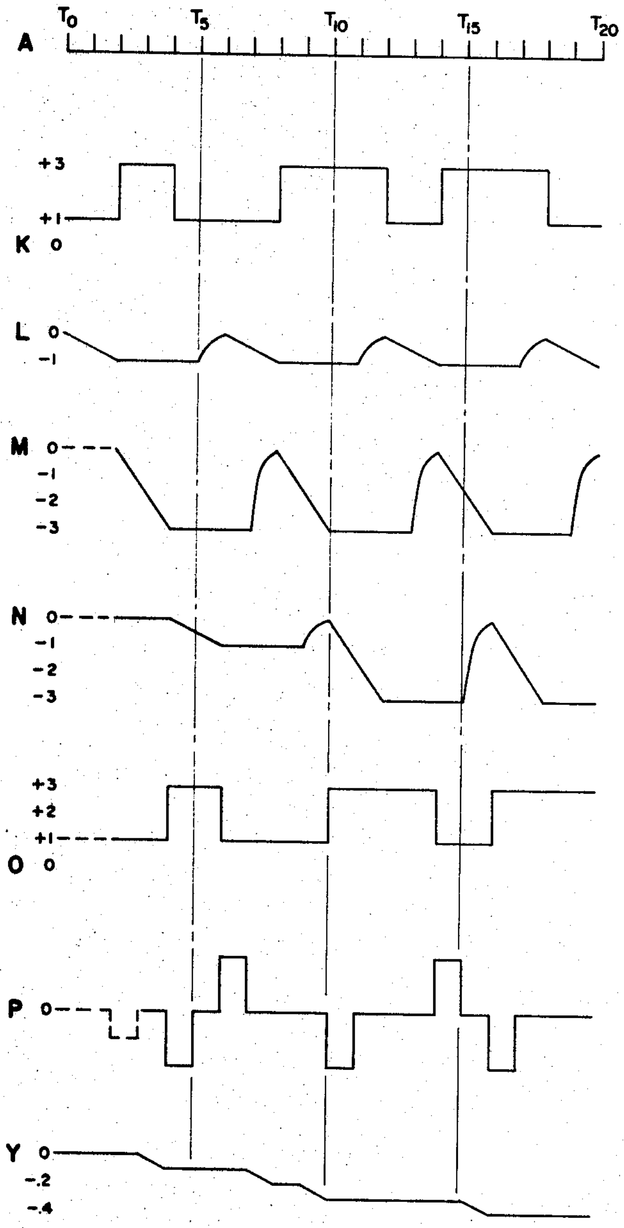
Figure 3A:
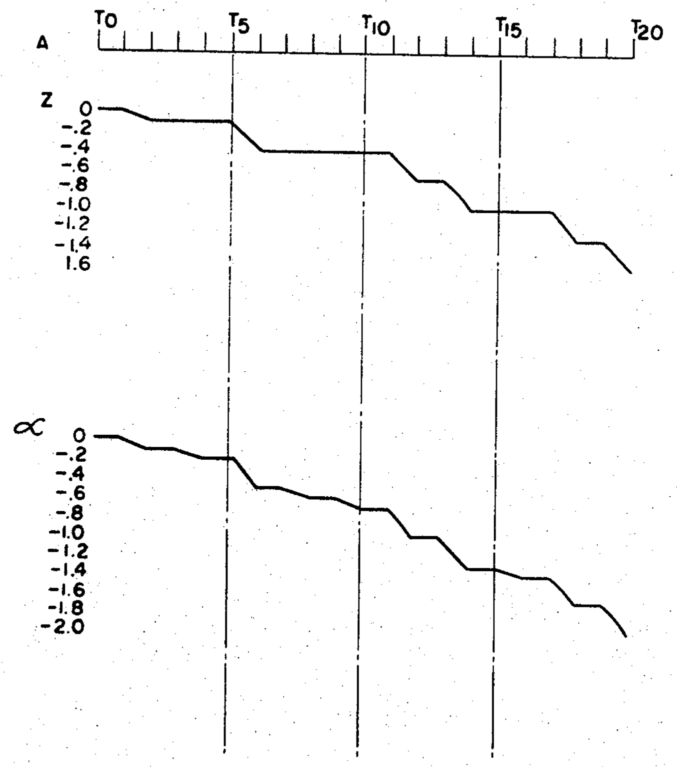

The novel features which are believed to be characteristic of the invention are set forth with particularity in the appended claims. The invention and further objects and advantages thereof can best be understood by reference to the following description and accompanying drawings in which:

FIG. 1 is a diagram, partly in schematic and partly in block diagram form, illustrating one embodiment of the invention, FIG. 2 is a series of graphs illustrating waveforms present at various points in the circuit of FIG. 1 for an ideal input pulse code modulated signal centered around 0 volt, i.e., having zero offset, FIG. 3 is a second set of waveforms at the same points in the circuit of FIG. 1 as the correspondingly designated waveforms illustrated in FIG. 2 for an ideal pulse code modulated input signal having a fixed offset of +2 volts, and FIG. 3*a* is directed to waveforms Z and $\alpha$ as related to FIGS. 1 and 3.

Referring now to the drawings, FIG. 1 illustrates one embodiment of the invention for operating on a pulse code modulated video signal to remove offset about a zero baseline due to such things as 60 cycle, 120 cycle and 400 cycle from power supply ripples and frequency sensitive attentuation in intermediate circuits. The circuit contains no wow because of the signal itself due to the D.C. coupling and is fast because it detects when negative or positive portions of the signal occur and the servo loop may be updated faster. The circuit is designed with sample and hold circuits having a time constant to remember the average of the past several bit periods, for example 10 bit periods, to damp out large changes in a single bit period.

Referring to FIG. 1, an input amplifier 10 having appreciable gain is shown with an input terminal 11 to which the received pulse code modulated video signals may be applied. Three operational amplifiers, 12, 13 and 14, are illustrated having capacitors 15, 16 and 17 connected thereacross, with normally open reset switches 18, 19 and 20 and connected across the capacitors, respectively. The inputs of operational amplifiers 12, 13 and 14 are connected from the output of amplifier 10 through resistors 21, 22 and 23, respectively, and normally open series switches 24, 25 and 26, respectively. The outputs of amplifiers 12, 13 and 14 are connected to one side of normally open switches 27, 28 and 29, respectively, and to one side of normally open switches 30, 31, and 32, respectively. The other side of switches 27, 28 and 29 are connected together and to the input of an inverting operational amplifier 33, whereas the other side of switches 30, 31 and 32 are connected together and to the input of an inverting operational amplifier 34. Amplifier 33 has a resistor 35 connected from its input to its output and a resistor 36 connected from the common point of switches 27, 28 and 29 to its input. Amplifier 34 has a resistor 37 connected from the output of amplifier 33 to its input and a resistor 38 connected from its input to its output, as well as a resistor 39 connected from the common point of switches 30, 31, and 32 to its input. The output of amplifier 34 is connected to the input of two Schmitt trigger circuits 40 and 41, well known in the art. The output of Schmitt trigger circuits 40 and 41 are connected to the inputs of a bistable circuit 42, such as a multivibrator, also well known in the art, which is gated or strobed by clock 43. The two outputs, representing the states of bistable circuit 42, are connected respectively to "and" circuits 44 and 45. The other input to the "and" circuits 44 and 45 comes from a fifty percent clock 46.

A feedback baseline updating loop includes operational amplifiers 47 and 48. Operational amplifier 47 has a capacitor 49 connected from its input to its output and a resistor 50 in series with a normally open switch 51 connected across capacitor 49. Operational amplifier 48 has a capacitor 52 connected from its input to its output and a resistor 53 in series with a normally open switch 54 connected across capacitor 52. The output of amplifier 33 is connected through a normally open switch 55 and series resistor 56 to the input of amplifier 47, and through a normally open switch 57 and series resistor 58 to the input of amplifier 48. Amplifiers 47 and 48, with their associated components, constitute pulse averaging amplifiers or sample and hold means and have time constants equivalent to approximately 10 bit periods.

The outputs of amplifiers 47 and 48 are connected through equal resistors 59 and 60, respectively, to a common junction 61. Junction 61 in turn is connected back to the input of amplifier 10 in a negative sense, providing negative feedback for baseline offset correction.

To best describe the operation of the circuit illustrated in FIG. 1, the waveforms illustrated in FIG. 2 show an example where a pulse code modulated video signal such as shown in FIG. 2K is applied to input terminal 11. This signal is ideal and varies around 0 volts baseline, plus or minus 1 volt, with zero offset. FIG. 2A represents clock pulses generated by a clock (not shown) from time $T_0$ to time $T_{20}$, including 10 bit periods of the input signal shown in FIG. 2K. The pulses are generated by the clock in any well known manner. FIG. 2B illustrates a timed switching signal applied to switch 24, FIG. 2C a timed switching signal applied to switch 25, and FIG. 2D a timed switching signal applied to switch 26. FIGS. 2E, 2F, and 2G illustrate timed reset switching signals applied to the reset switches 18, 19, and 20, respectively. The timing signals shown in 2B, 2C, and 2D are also applied to the readout switches 29, 27 and 28, respectively, of amplifiers 14, 12 and 13, respectively. The switching signals illustrated in FIG. 2H, 2I, and 2J are applied to switches 30, 31, and 32 to read out the outputs of amplifiers 12, 13 and 14, respectively.

FIGS. 2L, 2M and 2N illustrate the output of the integrators including amplifiers 12, 13 and 14, respectively. Taking FIG. 2L for example, during the time from $T_0$ to $T_2$ the integrator rises from 0 volts to +1 volt, or the inverse of the intergral of the imput signal in FIG. 2K, due to the fact that the switching signal illustrated in FIG. 2B has closed switch 24 during this time. (+1 volt has been used to simplify the example. Any reasonable integrating time constant can be used.) During the time $T_2$ to $T_5$, the signal of FIG. 2B is removed and switch 24 is opened so the charge on capacitor 15 is held. During the time from $T_5$ to $T_6$, the switching signal of FIG. 2E closes reset switch 18 discharging the capacitor 15 and returning the signal of FIG. 2L to zero. This cycle repeats itself in the example illustrated since at the commencement of each integrating period at times $T_6$, $T_{12}$ and $T_{18}$ the signal shown in FIG. 2K is negative, such that the integrated value goes posittive. The integrators, including amplifiers 13 and 14 operate in a similar manner, with the integrator, including amplifier 13 going negative at times $T_2$, $T_8$ and $T_{14}$ due to the positive sense of the signal of FIG. 2K, and the integrator including amplifier 14 going positive at time $T_4$ and negative at times $T_{10}$, $T_{16}$ due to the respective negative and positive senses at those times of the signal illustrated in FIG. 2K. The dashed portions during the first time periods of the diagram, such as shown in FIGS. 2M, 2N, and other subsequent figures, are due to the start-up of the machine. It is assumed that the values at this time are zero.

The single-integrated analog, signal illustrated in FIG. 2O is present at the output of amplifier 33 and is derived by applying the various outputs of amplifiers 12, 13 and 14 to the inputs of amplifier 33 as follows. During the time period from $T_2$ to $T_4$, the switching signal of FIG. 2C closes switch 27 applying the signal illustrated in FIG. 2L to the input of amplifier 33. This is during the period in which the amplifier 12 is in the hold condition and the signal of FIG. 2L is +1 volt. Amplifier 33 inverts this and the output of the amplifier illustrated in FIG. 2O is thus −1 volt during this time period. During the time period from $T_4$ to $T_6$, the signal illustrated in FIG. 2D closes switch 28, applying the signal of FIG. 2M to the input of amplifier 33. This signal is negative 1 volt and is invented to yield a signal of positive 1 volt in FIG. 2O at the output of amplifier 33 by the amplifier. Tracing down the switching diagram and applying the appropriate voltages from FIG. 2L, 2M and 2N to the input of amplifier 33, will yield the signal illustrated in FIG. 2O which is referred to as the single-integrated analog signal.

Turning now to the signal illustrated in FIG. 2P, which is referred to as the difference-integral analog signal and is present at the output of amplifier 34, it can be seen how this signal is derived by again referring to the switching signals 2B, 2C and 2D and 2H, 2I and 2J which apply the various signals from the output of the integrators including amplifiers 12, 13 and 14 through the amplifier 33 and also directly to the input of amplifier 34. Again, the initial portion of this curve is shown in dashed form, including the first pulse which has a magnitude of +1 volt, since this is a start-up condition. It can be seen that all of the succeeding pulses have twice the amplitude of the first pulse, or 2 volts. If it is desired to have an output pulse under steady state conditions for the difference-integral analog signal of 1 volt, this may be accomplished by making the resistor 38 one-half the size of the resistors 37 and 39. However, this is not done here for purposes of illustration.

During the time from $T_0$ to $T_1$, the switching signals illustrated in FIGS. 2B and 2I closes the switches 29 and 31. The switch 29 applies the signal present in FIG. 2N to the input of amplifier 33. This is zero volts and we get zero volts out. Switch 31 applies the signal of FIG. 2M to amplifier 34. Again this is zero volts and zero volts added to the output of amplifier 33 or zero, yields an output of zero from amplifier 34. The same is true until the time period $T_2$ to $T_3$. During this time period the signals of FIGS. 2C and 2J close switches 27 and 32. Switch 27 applies the signal of FIG. 2L or +1 volt to the input of amplifier 33 such that the output of amplifier 33 is −1 volt, and is applied in turn to the input of amplifier 34. Switch 32 applies the signal of FIG. 2N or zero volts to the amplifier 34. Thus, the net signal applied to the input of 34 is −1 volt such that the output of 34 in FIG. 2P is +1 volt. During the time period from $T_3$ to $T_4$, the signals of FIGS. 2C and 2H close switches 27 and 30. Switch 27 applies the signal of 2L or +1 volt to the input of amplifier 33 which, in turn, applies −1 volt to the input of amplifier 34. Switch 30, however, also applies the signal of FIG. 2L to the input of amplifier 34. Thus, the +1 volt coming through switch 30 is cancelled by the −1 volt coming from amplifier 33 and the net output is zero volts from amplifier 34, as illustrated in FIG. 2P. During the next succeeding time period, $T_4$ to $T_5$, the signals of FIGS. 2D and 2H close switches 28 and 30. Thus, the input signal of FIG. 2M is applied to the input of amplifier 33, or −1 volt. This is inverted by amplifier 33 and is applied as +1 volt to the input of amplifier 34. The switch 30 applies the signal of FIG. 2L or +1 volt to the input of amplifier 34. Thus, a net +2 volts is applied to the input and when inverted at the output, appears as the −2 volts between times $T_4$ and $T_5$ illustrated in FIG. 2P. This negative signal is indicative of the positive transition illustrated in FIG. 2K at the time $T_2$, one bit period later.

Proceeding between times $T_5$ and $T_6$, signals of FIGS. 2D and 2I close switches 28 and 31. Both of these apply the output of amplifier 13 or FIG. 2M to the inputs of amplifiers 33 and 34. Thus, the inverted signal coming from the output of amplifier 33 cancels itself at the input of amplifier 34 with a net zero input to amplifier 34 and a zero output, as illustrated in FIG. 2P. During the time from $T_6$ to $T_7$, however, the signals of FIGS. 2B and 2I close switches 29 and 31. Switch 29 applies the signal of FIG. 2N, or +1 volt, to the input of amplifier 33 which is inverted and is applied as −1 volt to the input of amplifier 34. Switch 31 applies the signal of FIG. 2M, or −1 volt, to the input of amplifier 34. Thus, a total of −2 volts is applied to the input of amplifier 34 which inverts it such that +2 volt signal appears between times $T_6$ and $T_7$ in FIG. 2P. This is indicative of the negative transition one bit period previous at time $T_4$ in FIG. 2K.

Continuing in this manner, the remainder of the signal illustrated in FIG. 2P may be derived. This signal is applied to the inputs of the Schmitt trigger circuits 40 and 41 of FIG. 1 to derive the signals shown in FIGS. 2Q and 2R, the respective outputs of triggers 40 and 41. As shown, the positive pulses in FIG. 2P trigger the trigger 40 to yield negative pulses at the output of trigger 40, and the negative pulses of FIG. 2P serve to trigger the Schmitt trigger 41, yielding negative pulses at its output. Thus, the pulses of FIGS. 2Q and 2R are indicative of negative true signals and positive true signals, respectively, and are fed as inputs to the bistable circuit 42 of FIG. 1, which is strobed in the middle of each bit period by the clock signal in FIG. 2S.

The graphs illustrated in FIG. 2T and 2U are the two outputs of bistable circuit 42 and are called difference-integral data negative and positive signals, respectively.

At time $T_3$, when the negative true signal of FIG. 2Q is strobed by the clock pulse of FIG. 2S, the output T of bistable circuit 42 is driven negative. At time $T_5$, when the positive true signal of FIG. 2R is strobed by FIG. 2S, the bistable circuit returns to its positive state. At time $T_7$, the negative signal of FIG. 2Q is strobed and the bistable circuit returns to the negative state. At time $T_9$, the signal of FIG. 2S sees nothing in either FIGS. 2Q or 2R and the bistable circuit remains negative. At time $T_{11}$ the strobed signal sees the positive true signal of FIG. 2R, returning the bistable circuit to the positive state, etc. FIG. 2U is merely FIG. 2T inverted, or the other side of the output of bistable circuit 42. A fifty percent clock 46 generates the signal shown in FIG. 2V which is a negative true signal and goes from 0 volts at time $T_1$ to −1 volt, returning to 0 volts at time $T_2$. The "and" circuit 44 receives both the signals of FIGS. 2T and 2V and when both these are negative generates a negative read signal as illustrated in FIG. 2W, for instance, during time periods $T_3$ to $T_4$, $T_7$ to $T_8$, $T_9$ to $T_{10}$, etc. In a similar manner, the signals of FIGS. 2U and 2V are applied to the "and" circuit 45 yielding the positive read signal of FIG. 2X when both these signals are negative, such as at times $T_5$ to $T_6$, $T_{11}$ to $T_{12}$, $T_{13}$ to $T_{14}$, etc.

For purposes of illustration, the connection between the point 61 and the input of amplifier 10 is open and an open loop error signal is generated. Thus, during the time from $T_0$ to $T_3$, no negative read signal occurs in FIG. 2W and the switches 51 and 55 are opened. However, during the time $T_3$ to $T_4$ a negative read signal occurs and these switches are closed by "and" gate 44, applying the output of amplifier 33 or FIG. 2O to the input of amplifier 47. This signal is −1 volt during this time period and since the time constant of the amplifier is of the order of 10 bit periods, the capacitor 49 is charged up to approximately $\frac{1}{10}$ volt. This is held until the time $T_7$ to $T_8$, during which another read signal occurs in FIG. 2W and during which FIG. 2O is again −1 volt with another resulting rise of slightly less than $\frac{1}{10}$ volt in the signal at the output of amplifier 47. Following the same procedure, using the positive read signal and applying the signal of FIG. 2O to the amplifier 48, by closing switches 54 and 57 with gate 45 the graph of FIG. 2Z may be generated.

The graph of 2α is a composite of FIGS. 2Y and 2Z divided by 2. This is so since the resistors 59 and 60 of FIG. 1 are of equal magnitude and the signal appearing at the junction 61 is the average of the signals appearing at the output of the amplifiers 47 and 48. This signal can be seen to vary around 0 volts with slight deviations. It will be appreciated that this illustration describes an open loop configuration and ignores the slight decrease in the charge rate of the capacitors 49 and 52 in subsequent time periods due to the existing charge. These differences obviously would tend to bring the errors down.

Turning now to FIG. 3, an input signal such as illustrated in FIG. 3K, equivalent to the signal illustrated in FIG. 2K but offset from the zero volt baseline by +2 volts, is applied to the same point as shown in FIG. 2. Referring to FIGS. 3L, 3M and 3N, it can be seen that the integrators including the amplifier 12, 13 and 14 of FIG. 1 now have different magnitudes of signals applied thereto during the same time periods. Thus, FIG. 2L +1 volt is applied to amplifier 12 between times $T_0$ and $T_2$, driving it to −1 volt, which is held from time $T_2$ to $T_5$ and reset from $T_5$ to $T_6$' However, in FIG. 2M at time $T_2$, +3 volts is applied to amplifier 13 charging the capacitor 16 to −3 volts from time $T_2$ to $T_4$. This is held from time $T_4$ to $T_7$ and reset from $T_7$ to $T_8$ and repeated. In FIG. 3N, the capacitor 17 across amplifier 14 is charged from zero to −1 volt by the positive 1-volt occurring in FIG. 3K, which is held until time $T_9$ at which it is reset to 0. At time $T_{10}$, positive 3 volts is applied and capacitor 17 is charged to −3 volts. These values yield the single-integrated analog signal of FIG. 3O similar to that illustrated in FIG. 2O but offset to vary between +1 and +3 volts. Following through the various switching signals, the difference-integral of FIG. 3P can be seen to be identical to that of FIG. 2P, with a small deviation in the dashed portion during startup. The circuitry thus generates the identical read signals of FIGS. 2W and 2X for the input signal of FIG. 3K by reading the signal of FIG. 3O at the same time.

Using the read signals of FIGS. 2W and 2X, to read the single-integrated analog signal of FIG. 3O, the open loop negative error signal of FIG. 3Y and the open loop positive error signal of FIG. 3Z are generated. In this instance, with the 2-volt offset of FIG. 3K, it can be seen that the error signals of FIGS. 3Y and 3Z are cumulative. The average of their sums is illustrated in FIG. 3$\alpha$, which is the open loop error signal present at point 61 of FIG. 1 for the input signal illustrated in FIG. 3K. Again it should be remembered that this is an open loop signal and that the effects of closing the switches 51 and 54 are ignored. As previously mentioned, the effects of closing these switches would be to reduce the magnitude of this error signal.

From the foregoing it can be seen that the invention utilizes a signal regenerated by a difference-integrator type data detector on a bit by bit basis to gate or enable one of two averaging circuits, one which averages the negative level at the output of the detector filter (in the example shown, a multiplex of single bit integrals), and one which averages the positive level. Thus, if the detector detects that the signal level is positive, the positive averaging circuit is enabled and the negative averaging circuit merely holds its previous value. The converse occurs if the detector detects the signal is negative. The means of the two averaging circuit outputs is then used either as a reference to offset decision making circuitry or, as is illustrated in FIG. 1, as a baseline correcting voltage fed back to an input amplifier to form a baseline tracking loop. The latter is preferable since it also reduces the dynamic range required of the active devices.

Since the baseline correcting voltage is normally unaffected by message content the loop can be made relatively fast, for higher frequency wow or noise rejection, without suffering exorbitant message dependence on overall performance. The worst contamination of the baseline correcting voltage occurs if noise causes an error in the regenerated data, thereby introducing a false sample. Under normal operating conditions, the signal to noise ratio is such that these occurrences are rare. The probability of gating through a noise contaminated sample can be reduced by enabling the averaging circuit only if the data regenerated by the two techniques agree. When the two detectors disagree, the suspect pulse will be ignored in updating either reference level. A baseline correcting voltage could be further safeguarded against excessive noise by limiting the incremental readjustment to a fraction of its existing value. The gating shown in the samples given operates only on the basis of a difference-integral decision. The gating, however, could contain the logical elements to close switches 51 and 55 when both the difference-integral and single-integral decisions indicate that the single-integral output is positive of example, and to close switches 54 and 57 when both indicate the single-integral output is negative.

What is claimed is:

1. A baseline tracking loop for a pulse code modulated signal detector comprsing:

an input amplifier for receiving an incoming pulse code modulated video signal;

means for integrating, holding and summing said signal over successive overlapping time periods to provide a delayed integrated analog of said signal and an indication of the polarity of said signal coincident with said analog to determine whether said analog is positive or negative during each bit period thereof;

first sample and hold means to sample and store the voltage levels of each positive bit over a number of said bit periods;

second sample and hold means to sample and store the voltage levels of each negative bit over a number of said bit periods;

means to detect the average value of said first and second sample and hold means; and, feedback means connecting said average value back to said input amplifier to correct for baseline offset.

2. The combination of claim 1 in which said means for integrating and holding comprises a plurality of integrators gated to integrate over succeeding bit periods of said signal and to hold over more than one bit period after integrating, such that the integrated values from ones of said integrators integrating in successive bit periods are simultaneously available.

3. The combination of claim 2 in which said means for integrating, holding and summing includes a first inverting amplifier having an input connected successively to the outputs of said integrators in the bit period immediately following integration and a second inverting amplifier having an input connected to the output of said first inverting amplifier and to the outputs of said integrators in the bit period commencing one-half bit after said bit period immediately following integration;

trigger means connected to the output of said second inverting amplifier to provide separate transition pulses indicating positive and negative transitions;

a bistable circuit having an input connected to the output of said trigger means;

a clock for generating strobe pulses in the center of each bit period connected to said bistable circuit to strobe it to cause the output of one side of said bistable circuit to be negative when the last of said transition pulses indicates a negative transition, and the output of the other side of said bistable circuit to be negative when the last of said transition pulses indicates a positive transition;

a fifty percent clock for generating a signal which has one level during the first half of each bit period and a second level during the second half;

positive and negative read "and" gates;

means connecting one side of the output of said bistable circuit to one input of one of said "and" gates and the other side of the output of said bistable circuit to one input of the other of said "and" gates; and means connecting the output of said fifty percent clock to the other input of each of said "and" gates for providing a negative read pulse from one of said "and" gates during each one-half bit period when said fifty percent clock has one level and the output of said bistable circuit indicates a negative state, and a positive read pulse from the other of said "and" gates during each one-half bit period when said fifty percent clock has said one level and the output of said bistable circuit indicates a positive state, said one level of said fifty percent clock occurring during the second half of each of said bit periods.

4. The combination of claim 3 including:

means for connecting the output of said first inverting amplifier to the input of said first sample and hold means during each of said positive read pulses and to the input of said second sample and hold means during each of said negative read pulses.

5. The combination of claim 4 in which said means to detect the average value comprises two equal resistors, each connected from the output of one of said sample and hold means to a common point; and, means connecting said common point to the input of said input amplifier in the opposite sense to said signal.

6. The combination of claim 1 in which said means to detect the average value comprises two equal resistors, each connected from the output of one of said sample and hold means to a common point; and means connecting said common point to the input of said input amplifier in the opposite sense to said signal.

7. The combination of claim 1 in which said sample and hold means each comprise an operational amplifier having a capacitor connected across its input and output and having a resistor and switch connected in series across said capacitor for providing a time constant of a plurality of said bit periods.

8. The combination of claim 5 in which said sample and hold means each comprise an operational amplifier having a capacitor connected across its input and output and having a resistor and switch connected in series across said capacitor for providing a time constant of a plurality of said bit periods.

References Cited

UNITED STATES PATENTS

| | | | |
|---|---|---|---|
| 2,905,837 | 9/1959 | Barry | 307—88.5 |
| 3,011,128 | 11/1961 | Filipowsky | 329—104 X |
| 3,146,424 | 8/1964 | Peterson et al. | |
| 3,244,986 | 4/1966 | Rumble | 328—118 |

ALFRED L. BRODY, *Primary Examiner.*

U.S. Cl. X.R.

328—57, 109, 118; 329—139, 140, 178; 340—167

UNITED STATES PATENT OFFICE

CERTIFICATE OF CORRECTION

Patent No. 3,421,088 January 7, 1969

Ernest J. Salley et al

It is certified that error appears in the above identified patent and that said Letters Patent are hereby corrected as shown below:

Column 1, line 60, "spit" should read -- split --. Column 2, line 18, "carry" should read -- vary --. Column 4, line 6, after "shown)" cancel "in". Column 5, line 37, after "shifter" insert -- network --; line 41, after "of" cancel "a"; line 42, "phose" should read -- phase --. Column 8, line 30, "trnasistor" should read -- transistor --; line 33, "33" should read -- Q3 --; line 34, "stages" should read -- stage --; line 39, "33" should read -- Q3 --.

Signed and sealed this 17th day of March 1970.

(SEAL)
Attest:

Edward M. Fletcher, Jr.
Attesting Officer

WILLIAM E. SCHUYLER, JR.
Commissioner of Patents